(12) United States Patent
Fleury et al.

(10) Patent No.: US 8,376,607 B2
(45) Date of Patent: Feb. 19, 2013

(54) METHOD FOR THE CONTINUOUS IMPLEMENTATION OF POLYMERISATION PROCESSES

(75) Inventors: Pierre-Alain Fleury, Ramlinsburg (CH); Thomas Isenschmid, Magden (CH); Pierre Liechti, Muttenz (CH)

(73) Assignee: List Holding AG, Arisdorf (CH)

( * ) Notice: Subject to any disclaimer, the term of this patent is extended or adjusted under 35 U.S.C. 154(b) by 888 days.

(21) Appl. No.: 11/576,414

(22) PCT Filed: Mar. 30, 2005

(86) PCT No.: PCT/EP2005/010584
§ 371 (c)(1), (2), (4) Date: Mar. 30, 2007

(87) PCT Pub. No.: WO2005/097008
PCT Pub. Date: Oct. 20, 2005

(65) Prior Publication Data
US 2009/0192631 A9      Jul. 30, 2009

(30) Foreign Application Priority Data

Sep. 30, 2004  (DE) .......................... 10 2004 048 044
Jan. 13, 2005  (DE) .......................... 10 2005 001 802

(51) Int. Cl.
*A21C 1/00* (2006.01)
*B01F 7/00* (2006.01)

(52) U.S. Cl. .................................................. 366/97

(58) Field of Classification Search ................... 366/97
See application file for complete search history.

(56) References Cited

U.S. PATENT DOCUMENTS

| | | | |
|---|---|---|---|
| 3,880,407 A | 4/1975 | List | |
| 4,141,934 A | 2/1979 | Wingler et al. | |
| 5,122,263 A * | 6/1992 | Huber | 210/110 |
| 5,147,135 A * | 9/1992 | List et al. | 366/303 |
| 5,876,115 A * | 3/1999 | Schebesta et al. | 366/97 |
| 5,921,675 A | 7/1999 | Zikeli et al. | |
| 6,039,469 A | 3/2000 | Palmer | |
| 6,245,851 B1 * | 6/2001 | Petrocelli et al. | 524/459 |
| 6,414,054 B1 * | 7/2002 | Boffard et al. | 523/322 |
| 2004/0145964 A1 | 7/2004 | Kunz et al. | |
| 2005/0024987 A1 | 2/2005 | Kunz et al. | |
| 2007/0179322 A1* | 8/2007 | Komplin et al. | 568/492 |

FOREIGN PATENT DOCUMENTS

| | | |
|---|---|---|
| DE | 2349106 A1 | 5/1974 |
| DE | 10150900 C1 | 4/2003 |
| DE | 10303167 A1 | 8/2004 |
| EP | 0517068 A1 | 12/1992 |
| EP | 1384728 A1 | 1/2004 |
| WO | 9712666 A1 | 4/1997 |

* cited by examiner

*Primary Examiner* — Walter D Griffin
*Assistant Examiner* — Christopher Vandeusen
(74) *Attorney, Agent, or Firm* — Bachman & LaPointe, P.C.

(57) ABSTRACT

A process for continuously performing polymerization processes, wherein monomer(s), catalysts, and initiators are added continuously to a backmixed mixing kneader (1-1.3) with a length/diameter ratio of 0.5-3.5 and backmixed therein with already reacted product, and the reacted product is simultaneously drawn off continuously from the mixing kneader (1-1.3).

7 Claims, 3 Drawing Sheets

METHOD FOR THE CONTINUOUS IMPLEMENTATION OF POLYMERISATION PROCESSES

BACKGROUND OF THE INVENTION

The invention relates to a process for continuously performing polymerization processes, especially for the homo- or copolymerization of thermoplastics and elastomers, and a system therefore.

A considerable portion of polymerization reactions, especially for the preparation of homo- and copolymeric thermoplastics and elastomers, are performed commercially as a slurry or solution process in one or more series-connected, continuous, backmixed, vertical stirred tank reactors, known as "CSTRs", continuous stirred tank reactors.

These stirred tank reactors have the task of very homogeneously distributing the monomers, catalysts and initiators in a solvent/diluent under precisely defined process conditions, such as temperature and pressure, in order that the reaction proceeds in a controlled manner, a uniform product quality with the desired molar mass is formed and the heat of reaction is also controlled.

The problem of these stirred tank reactors consists in the fact that it is only possible to process products with a low apparent viscosity. With rising concentration of the polymer in the solvent/diluent, the apparent viscosity of the reaction mixture rises such that the stirrer finally cannot reaction mixture rises such that the stirrer finally cannot achieve sufficient convective flow. The consequence thereof is inhomogeneous distribution of the monomers. This leads to lump formation, poor molar mass distribution, caking, local overheating, up to and including an uncontrolled reaction of the entire reactor contents.

A further problem of stirred tank reactors is foam formation in the case of individual products, which can lead to blockages in the vapor draws.

The above-mentioned process risks lead to the fact that stirred tank reactors are operated with a large excess of solvents/diluents up to approx. 90% of the reaction mixture, or only conversions of less than 50% can be achieved in bulk polymerizations. As a consequence thereof, additional process steps for the mechanical/thermal removal of the diluent/solvent/monomer or for the post-reaction are necessary. This is generally effected in dewatering screws, condensation and drying systems and maturing tanks. They mean high capital, energy and operating costs. There are even new polymers which are not processable with a water stripping process!

Bulk polymerizations are also performed continuously in single-shaft or multishaft extruders (for example from Werner Pfleiderer, Buss-Kneter, Welding Engineers, etc.). These apparatus are designed for polymerizations in the viscous phase up to high conversions. They are constructed as continuous plug flow reactors and accordingly have a large L/D ratio of from >5 to approx. 40

The following problems occur here:

a) In the case of slow polymer reactions with reaction times of >5 minutes, in which the reaction mixture remains in the liquid state for a long period, the plug flow cannot be maintained. The very different rheological properties between the monomers and polymers prevent uniform product transport, which leads to undesired quality variations.

b) The high exothermicity of many polymerization processes and the dissipated kneading energy frequently make it necessary to remove these energies by means of evaporative cooling. This is done by evaporating a portion of the monomer or of an added solvent/diluent, condensing it in an external condenser and recycling the condensate into the reactor. Owing to the large L/D ratio and the large screw cross section for construction reasons, only very limited free cross-sectional areas are available for the removal of vapors. This leads to the undesired entrainment of polymers into the vapor lines and into the reflux condenser and, as a consequence thereof, to blockages.

c) In the preparation of (co)polymers from a plurality of different monomers, an additional complicating factor is that mainly the monomer with the lowest boiling point evaporates for the evaporative cooling, so that a shift in the monomer concentrations is established in the reactor, especially in the region of the entry orifice of the condensate reflux. This is generally undesired.

d) Another disadvantage is that the free product volume of screws is limited to about 1.5 m$^3$ for mechanical construction reasons, so that only low throughputs can be achieved in reactions with residence times of >5 minutes, which requires the installation of a plurality of parallel lines with correspondingly higher capital and operating costs.

A further means of performing bulk polymerizations up to high conversions is described in U.S. Pat. No. 5,372,418. Here, co- or contrarotating multiscrew extruders with non-meshing screws or screw pairs which convey in opposite directions for the polymerization of the monomers by backmixing with the polymer in the viscous phase are described. These apparatuses are capable in principle of performing polymerization processes up to high conversions and simultaneously of avoiding the above-described disadvantages a) (collapse of the plug flow) and c) (formulation shift through reflux) from the plug flow extruder. However, the above-described problems b) (reduced free cross section) and d) (size) still remain unsolved.

SUMMARY OF THE INVENTION

It is an object of the invention to find a process and a corresponding system which allow slow (co)polymerization reactions of thermoplastics and elastomers within the range of 5 and 60 minutes to be performed such that it is possible to work with a very small solvent excess, if any, typically <20% of the reaction mixture, and at viscosities which are $5 \times 10^4$-$5 \times 10^6$ higher than in the stirred tank, i.e. the unpopular mechanical/thermal solvent removal process step can be eliminated, conversion rates of 80-95% are allowed in (co)polymerizations, in the case of slow reactions, large throughputs up to 10 t/h with uniform quality are allowed, foam formation is largely prevented thanks to the elevated polymer concentration, the heat of reaction which arises and energy dissipated can be removed by means of evaporative cooling, i.e. large free cross sections are available for the vapors, the solvents or monomers used for the cooling can be determined back to the site of evaporation, so that no change in formulation in the reaction mixture arises. This is of great importance, especially in the case of (co)polymerizations.

It has been found that both homo- and copolymerization reactions can be performed successfully in mixing kneaders with residence times of >5 minutes in the highly viscous phase, i.e. with very little solvent (<20%), if any, up to a conversion of 80 to 95%, in which the monomer(s), catalysts, initiators, etc. are added continuously to a backmixed mixing kneader and backmixed therein with the already reacted product, and the reacted product is simultaneously drawn off continuously from the mixing kneader.

The mean residence time is adjusted via the "holdup" such that both the reaction time and at least 5 times the backmixing time are achieved.

The mixing kneader has the following apparatus features:

The L/D ratio is between 0.5 to 2.5.

All, both the dynamic and the static, mixing and kneading elements are self-cleaning, have close clearance and prevent dead unmixed zones through their arrangement and design.

The backmixing is effected through appropriate configuration of the mixing and kneading elements in the apparatus itself or through an external single- or multishaft recycling screw.

The product space is only partly filled, so that a sufficiently large free cross section is available for the drawing-off of vapors.

Such mixing kneaders, which may be single- or twin-shaft, co- or contrarotatory, are described in detail in DE 2349106 A1, EP 0517068 A1, EP 0853 491 A1, DE 10150900 C1 (PCT/EP02/11578; WO 03/035235A1). They are produced up to a size of 10 000 liters of free volume.

BRIEF DESCRIPTION OF THE DRAWINGS

Further advantages, features and details of the invention are evident from the description of preferred working examples which follows and with reference to the drawing, which shows.

DETAILED DESCRIPTION

Figure 1:
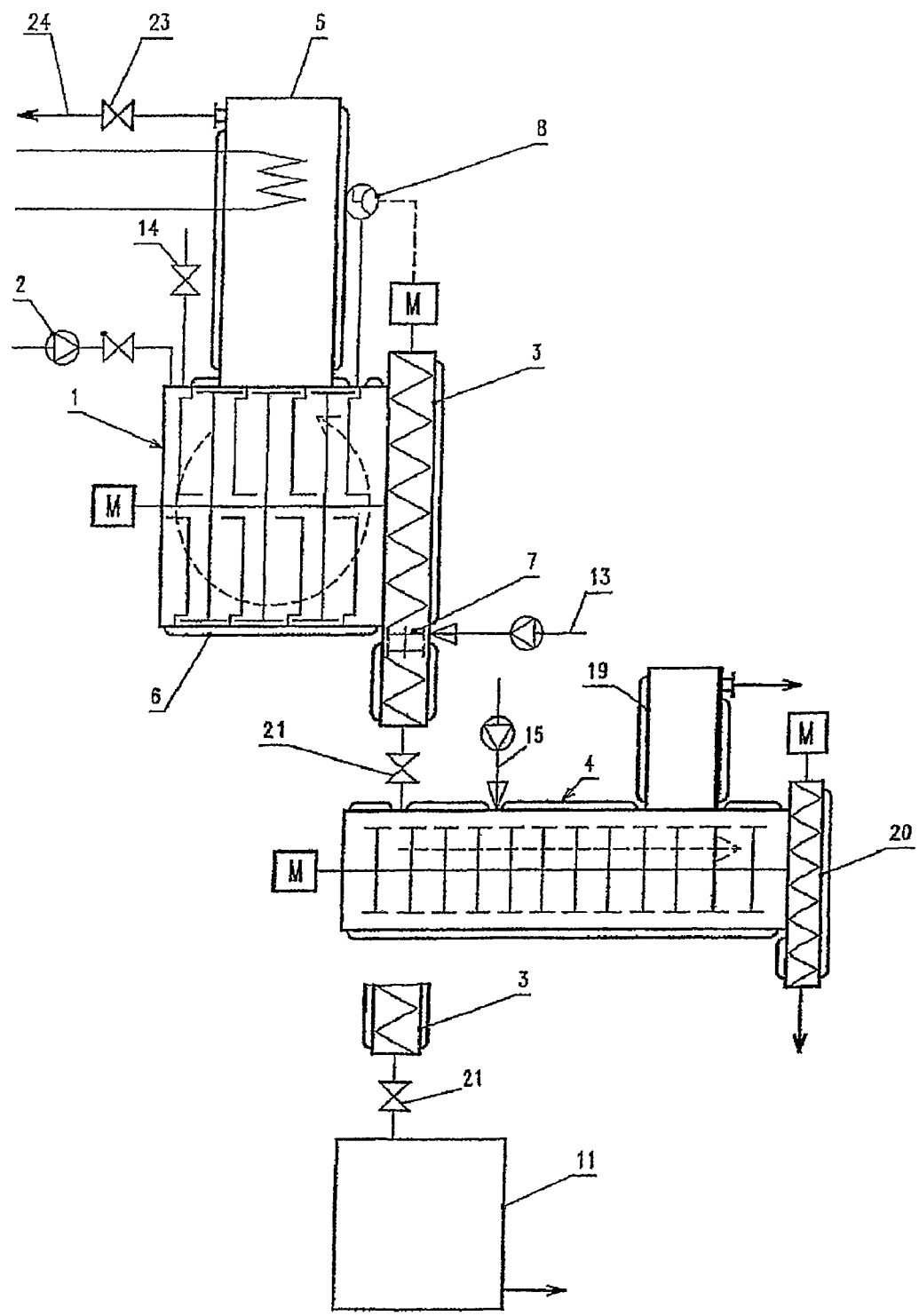
FIG. 1 a schematic illustration of an inventive plant for the homo- or copolymerization of thermoplastics and elastomers.

According to FIG. 1, in a single-shaft mixing kneader 1 which has backmixing stirrer shaft geometry and is surrounded by a heating jacket 6 and is filled partly with reacted product, monomer(s), catalysts, initiators and possibly small amounts of solvent are introduced continuously via appropriate metering devices 2 and backmixed in the process space. At the same time, the reaction product, for example by means of an attached discharge screw 3, is drawn off in such a way that the fill level, measured with a device 8 which is also connected by one or two shafts to a motor M for the single- or twin-shaft discharge screw 3, in the mixing kneader remains constant. The viscosity of the reaction mixture is adjusted by the selection of the reaction parameters such as throughput, temperature and solvent/monomer content such that it is possible to devolatilize directly in a downstream LIST residual degasser or extruder 4, or to react the unreacted monomers to completion in a downstream apparatus, for example a maturing tank 11.

Reaction temperature and pressure are preferably selected such that the monomer excess or the solvent content is within the boiling range. It is thus possible to remove the heat of reaction and the dissipated kneading energy through the evaporating solvent/monomer. This vapor is condensed in a reflux condenser 5 attached to the kneader and returned into the reaction mixture. A plurality of reflux condensers may also be distributed over the length. The condensation can also be realized externally and the condensate is metered homogeneously back into the polymer mixture with different nozzles.

As a result of the small L/D (length/diameter) ratio of the mixing kneader 1, the refluxing condensate is backmixed optimally and uniformly in the reactor, which, as already mentioned, constitutes a great problem in backmixing extruders with a large L/D ratio.

The backmixed kneading reactor 1 can be operated under vacuum, at atmospheric or under pressure. For polymerization systems which are operated with vacuum, a valve 23 is opened and the line 24 is attached to a vacuum pump. For polymerization systems which are operated at atmospheric, the valve 23 is opened and the line is left under atmospheric conditions.

For polymerization systems which are operated with pressures higher than ambient pressure, preference is given to controlling the system pressure to a particular value with an inert gas (e.g. $N_2$), which is done by means of a valve 14. The valve 23 is closed in this case.

The discharge screw 3 may also be equipped with mixing elements 7 for the mixing-in of reaction stoppers, stabilizers or the like fed in via a line 13, and also with retaining elements to form a gas-tight product plug in the case of pressure or vacuum operation of the mixing kneader 1. Optionally, reaction stoppers/stabilizers may be metered in via a line 15 upstream of or into the degasser 4.

A motor M, by means of which one or more stirrer shaft(s) 17 with stirring/kneading elements 18 in the degasser 4 are driven, is assigned to the degasser 4. The stirrer shaft geometry is configured so as to result in plug flow. In addition, one or more vapor dome(s) 19, through which the evaporating products can be drawn off, are attached to the degasser 4.

A further discharge screw 20, which is in turn driven by a motor M, is attached to the degasser 4. The degasser 4 is normally operated under vacuum. The valve 21 or, in its stead, an introduction gear pump build up a gas-tight product plug and allow the product introduced to flash as a result of pressure difference in the degasser 4. The degasser 4 warms the product cooled by the flash thanks to the kneading energy.

A discharge gear pump is normally flanged on at the discharge screw 20 in order to feed a pelletizer.

The discharge screw 3 allows the product optionally, as already mentioned, to be introduced via the valve 21 into the maturing tank 11, from which it is discharged after maturing.

Figure 2:
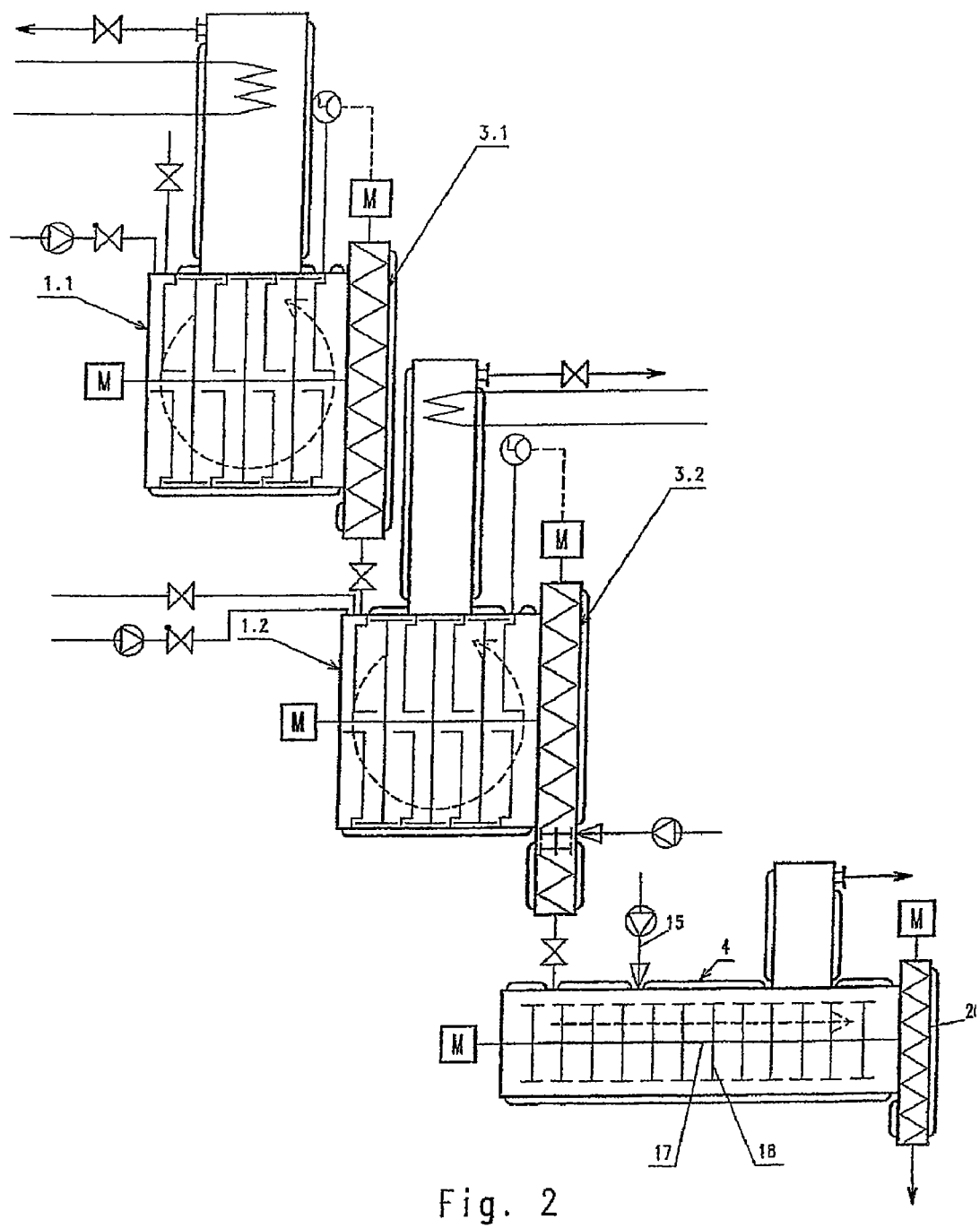
FIG. 2 a schematic illustration of a further working example of an inventive plant according to FIG. 1.

FIG. 2 shows a plurality of series-connected mixing kneaders 1.1, 1.2 with discharge screw 3.1, 3.2, in order, for example, to charge the individual mixing kneaders 1.1, 1.2 with different monomers for a graft polymerization, or in order to influence the molar mass distribution in the polymer. The mixing kneader 1.2 is followed downstream by the extruder 4.

Figure 3:
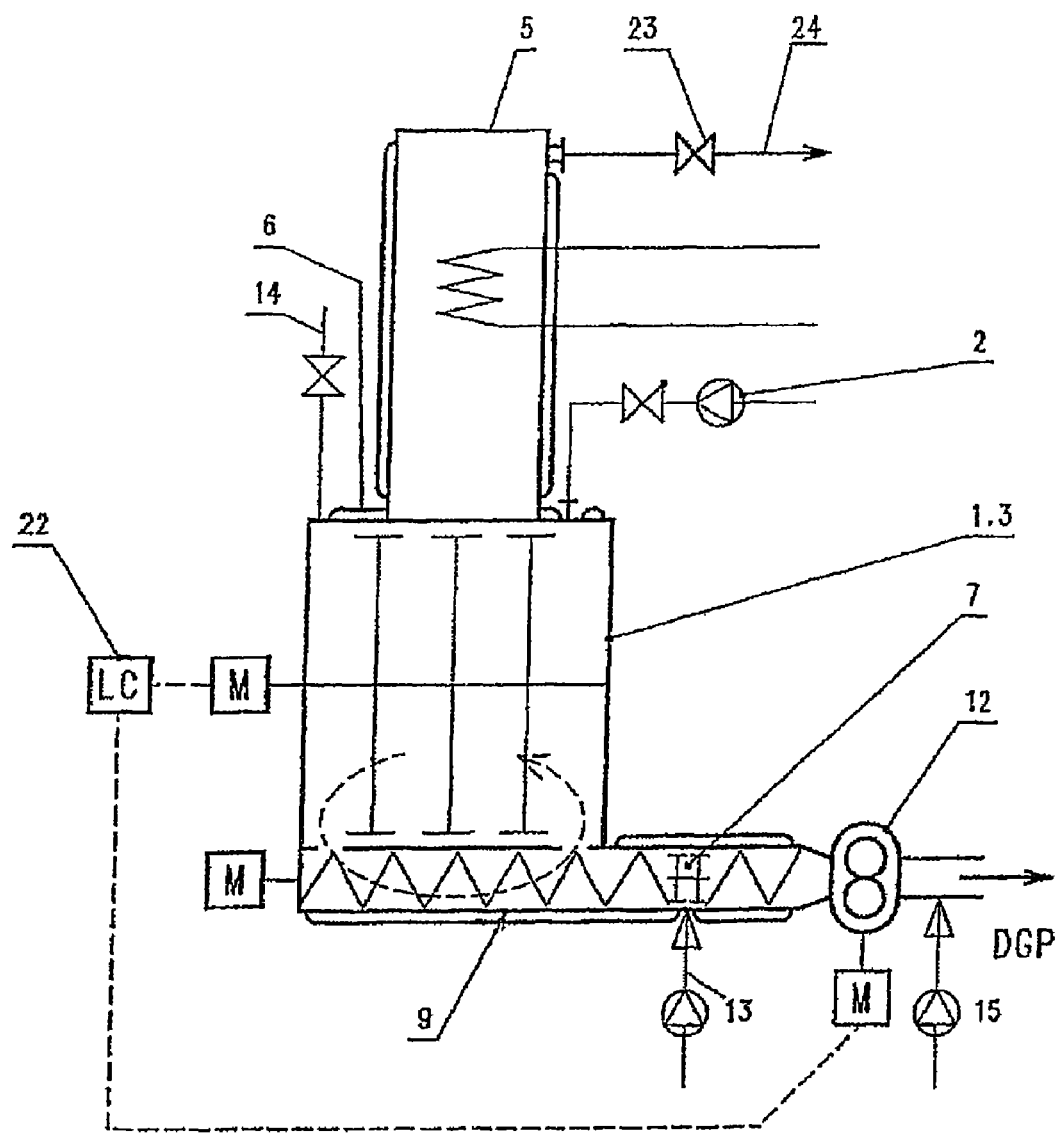
FIG. 3 a schematic illustration of a further working example of a plant for performing the process according to FIG. 1.

FIG. 3 shows the process similarly to FIG. 1, with the difference that the mixing kneader 1.3 is equipped with an external single- or twin-shaft recycle screw 9 which accomplishes both the backmixing and the continuous product discharge.

A downstream gear pump 12 or a valve which is connected via a control device 22 to the motor M of the mixing kneader 1.3 regulates the fill level in the mixing kneader.

The single-shaft or twin-shaft recycle screw 9 determines the degree of recycling, i.e. the ratio of mass flow circulated in the reactor to the discharged mass flow.

EXAMPLE 1

Continuous bulk polymerization of MMA above the glass transition temperature (novel process).

The backmixed LIST kneading reactor 1-1.2 has a total volume of 6 liters, and the casing is heated with an inlet temperature of 145° C. A cooled dome, wall temperature 15° C., which condenses the monomer vapors back into the process space, is disposed on the kneading reactor. A discharge twin screw (3-3.2) is mounted on the end side of the reactor (1-1.2) and discharges the polymer mixture with the same throughput as the monomer stream metered in. The jacket of the discharge twin screw (3-3.2) is heated to 210° C. A heated valve is installed downstream of the discharge twin screw, in order to ensure that the system is leakproof for the startup. The monomer feed tank and the kneading reactor are inertized with nitrogen ($N_2$) before startup. The internal pressure in the reactor is adjusted to 3.5 bar absolute with inert gas ($N_2$). The monomer metering is envisaged with a monomer tank in which the DTBP initiator with 4 g/kg of monomer has already been mixed in. A pump meters the monomer mixture against a pressure-retaining valve into the reactor.

With a throughput of 10 kg/h, the bulk polymerization of MMA has attained a conversion of 90%. The mean residence time is 20 minutes. The heat of reaction and the introduction of the kneading energy are removed by the evaporation of the monomer. The monomer vapors are mixed back into the polymer mixture by means of reflux condensation. The molecular weight (mass distribution, Mw) of 84 000 g/mol was achieved. This polymer material can then be metered to a residual degasser 4 (LIST residual degasser or extruder), in order to separate and to recycle the remaining 10% of monomer.

The production process to date was realized in a stirred tank reactor and was limited to a degree of monomer conversion of not more than 50% owing to the rise in viscosity during the polymerization. In this case, it was necessary for 50% of the total amount of monomer to be removed in the residual degassing stage. The novel above-described process shows a significant improvement because the amounts of monomer to be removed, in comparison to the current product process, is 5 times lower in the residual degassing stage.

The polymerization kinetics of MMA is classified as a monomer coupling system with termination. In such a kinetic system, a lowering in the molecular weight is expected with increasing conversion. This shows a further advantage of the novel process at 90% conversion over the process to date: the regulating additives (chain transfer agents) can be reduced or eliminated in order to achieve controlled molecular weights between 60 000-70 000 g/mol for applications such as DVD or the like.

N.B.:

The PMMA kinetics is limited to below 100% in the conversion at this temperature (145° C.) owing to the polymerization-depolymerization equilibrium. However, there exist other polymerization systems where a higher conversion up to 100% is possible. In such a case, the conversion can be increased in a maturing tank 11 connected downstream of the LIST kneading reactor. In this case, preference is given to using maturing tanks 11 because this allows the residual polymerization to be performed in a more economically viable manner.

A maturing tank 11 may be an adiabatic batch tank where the polymerization material receives additional residence time in order to conduct the reaction under adiabatic conditions as completely as possible to the end. Such batch tanks may also be considered as storage tanks. In this case, after a certain residence time in the storage tanks, the polymer mixture is forced out of the tank by means of a compression apparatus for the next processing step.

The maturing tank 11 may also be operated continuously. In this case, the polymer material is conveyed through the tank, possibly by means of a stirrer shaft, under adiabatic conditions, in order to achieve a particular residence time.

EXAMPLE 2

EP 0 209 253 A1 (manufacture of butyl rubber) discloses a continuous polymerization process of butyl rubber in an extruder. Here, the monomers are polymerized in a halogenated polymerization medium at constant pressure under boiling conditions with plug flow, using a modified aluminum catalyst. This converts the nonviscous monomer to a viscous tacky polymer with advancing reaction.

It has been found that, owing to the huge viscosity difference between monomer and polymer, the desired plug flow in the extruder cannot be maintained because the large content of nonvolatile monomer undermines the plug flow and prevents the product transport based on the shear gradient in the reactor. This leads to the fact that it is virtually impossible to obtain uniform product transport and hence homogeneous conversion rates.

In the case of use of a backmixed mixing kneader 1-1.3 according to the present invention, this problem can be avoided elegantly, since the comparatively small amount of monomer in the entire reactor is distributed uniformly, and the same product rheology thus exists everywhere.

LIST OF REFERENCE NUMERALS

| | |
|---|---|
| 1 | Mixing kneader/reactor |
| 2 | Metering device |
| 3 | Discharge screw |
| 4 | Extruder/degasser |
| 5 | Reflux condenser |
| 6 | Heating jacket |
| 7 | Mixing elements |
| 8 | Device pfor measuring the fill level |
| 9 | Recycle screw |
| 10 | |
| 11 | Maturing tank |
| 12 | Gear pump |
| 13 | Feed line |
| 14 | Valve |
| 15 | Line |
| 16 | |
| 17 | Stirrer shaft |
| 18 | Abrasive elements |
| 19 | Vapor dome |
| 20 | Discharge screw |
| 21 | Valve |
| 22 | Control device |
| 23 | Valve |
| 24 | Line |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |

| | |
|---|---|
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| M | Motors |

The invention claimed is:

1. A process for continuously performing polymerization processes in a backmixed horizontal kneader having a product space, a flux condenser communicated with the product space, backmixing stirrer shaft geometry, one or two kneading shafts which run in same or opposed directions and are arranged horizontally and have a length/diameter ratio of 0.5-3.5, comprising:
continuously feeding at least one reactant selected from the group consisting of monomer(s), catalysts, and initiators to the kneader so as to backmix the at least one reactant with already reacted product;
simultaneously drawing reacted product from the kneader, wherein the feeding and drawing steps are carried out so that the product space is only partially filled;
removing heat of reaction and kneading energy by evaporation of the monomer or solvent to produce vapors which are condensed in the reflux condenser; and
recycling condensed monomer or solvent to the kneader, characterized in that one or more reaction stoppers are added to a residual degasser (4) connected downstream of the mixing kneader (1-1.3), and this added medium simultaneously serves as a stripping agent for degassing of residual solvent and/or monomer(s).

2. The process as claimed in claim 1 characterized in that (co)polymers are prepared by connecting in series a plurality of mixing kneaders (1.1, 1.2, 1.3) which are charged with different monomers and/or operated at different reaction conditions.

3. The process as claimed in claim 1 characterized in that viscosity and reaction parameters in the mixing kneader (1-1.3) are adjusted so as to avoid foam formation.

4. The process as claimed in claim 1 characterized in that pressure in the mixing kneader (1-1.3) is regulated to a particular value by means of an inert gas.

5. The process as claimed in claim 1 wherein the process is a process for continuous homo- or copolymerization of thermoplastics and elastomers.

6. The process as claimed in claim 1 further comprising the step of drawing-off vapors from the product space.

7. The process as claimed in claim 1 wherein polymerization reactions are performed over a time of at least 5 minutes.

* * * * *